(12) United States Patent
Brewer

(10) Patent No.: US 9,686,390 B2
(45) Date of Patent: Jun. 20, 2017

(54) ATTACHABLE ELECTRONIC DEVICE HOLDER

(71) Applicant: Anne Brewer, Wilmington, NC (US)

(72) Inventor: Anne Brewer, Wilmington, NC (US)

(*) Notice: Subject to any disclaimer, the term of this patent is extended or adjusted under 35 U.S.C. 154(b) by 0 days.

(21) Appl. No.: 14/854,015

(22) Filed: Sep. 14, 2015

(65) Prior Publication Data

US 2016/0081209 A1 Mar. 17, 2016

Related U.S. Application Data

(60) Provisional application No. 62/050,050, filed on Sep. 12, 2014.

(51) Int. Cl.
*G08B 13/14* (2006.01)
*H04M 1/04* (2006.01)
*A45F 5/00* (2006.01)
*H04B 1/3888* (2015.01)
*G08B 21/24* (2006.01)

(52) U.S. Cl.
CPC .............. *H04M 1/04* (2013.01); *A45F 5/00* (2013.01); *H04B 1/3888* (2013.01); *G08B 21/24* (2013.01)

(58) Field of Classification Search
CPC ... G08B 13/14; G08B 13/1436; G08B 13/1472; G08B 21/24; A47F 5/0006; H05K 5/0204; H02J 7/0044; H04M 1/04; H04B 1/3888; A45F 5/00
USPC ........ 340/384.7, 457, 539.11, 539.32, 568.1, 340/571, 665, 666; 248/311.2, 314, 551; 320/114; 455/410, 424
See application file for complete search history.

(56) References Cited

U.S. PATENT DOCUMENTS 6,674,358 B1 * 1/2004 Tinsley ................... H04M 1/04
224/245
8,264,340 B2 * 9/2012 Mazzolini .............. G08B 13/14
340/521

* cited by examiner

*Primary Examiner* — Hung T Nguyen

(57) ABSTRACT

An attachable electronic device holder includes a substantially horizontal bottom support surface configured to at least partially support a weight of an electronic device. The bottom support surface includes a first edge and a second edge. A first substantially vertical surface is positioned proximate the first edge of the bottom surface and a second substantially vertical surface may be positioned proximate the second edge of the bottom surface. A fastener is attached to at least one of the bottom support surface, the first vertical surface, and the second vertical surface.

20 Claims, 3 Drawing Sheets

ATTACHABLE ELECTRONIC DEVICE HOLDER

I. CLAIM OF PRIORITY

This application is a continuation patent application of, and claims priority from, U.S. Provisional Patent Application Ser. No. 62/050,050, filed on Sep. 12, 2014, which is incorporated by reference herein in its entirety for all purposes.

II. FIELD OF THE DISCLOSURE

The disclosure relates to electronic device cases and holders.

III. BACKGROUND

People carry their electronic devices, e.g., cellular telephones, everywhere they go. In some such places, stowing the electronic device may be inconvenient or impractical. For example, an owner may not be able to fit a cellular telephone into their purse or a pocket. The electronic device may consequently be precariously balanced on a toilet paper roll dispenser or be left on an adjacent stadium seat, where it could be forgotten or subjected to moisture, filth, or other potentially damaging substances.

IV. SUMMARY OF THE DISCLOSURE

According to a particular embodiment, an apparatus a substantially horizontal bottom support surface configured to at least partially support a weight of an electronic device. The bottom support surface includes a first edge and a second edge. A first substantially vertical surface is positioned proximate the first edge of the bottom surface and a second substantially vertical surface may be positioned proximate the second edge of the bottom surface. A fastener is attached to at least one of the bottom support surface, the first vertical surface, and the second vertical surface.

According to another or the same embodiment, a third vertical surface is positioned proximate a third edge of the bottom support surface. A fourth vertical surface may be positioned proximate a fourth edge of the bottom support surface.

The bottom support surface and the first vertical surface may be adjustable with respect to the other of the bottom support surface and the first vertical support surface. One of the first vertical surface and the second vertical surface may be adjustable with respect to the other of the first vertical surface and the second vertical surface. The electronic device may include at least one of a cellular telephone, a tablet, and a baby monitor.

Another or the same embodiment may include a charging port and/or a power source for charging the electronic device. At least one of the first vertical surface and the bottom support surface may be constructed from an anti-microbial material. The first vertical surface may be constructed from a transparent or, semitransparent material. At least one of the first vertical surface and the bottom support surface may be constructed from an elastic material.

According to another or the same particular embodiment, a third surface may be positioned above the bottom support surface. The apparatus may be attached to a surface as an aftermarket item. The bottom support surface may be at an angle relative to a floor surface. The apparatus may include a key hook. The bottom support surface and/or a vertical surface may include an aperture, The apparatus may include a cup holder, a motion sensor, and/or alarm circuitry to remind a user of the electronic device.

These and other advantages and features that characterize embodiments are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments.

V. BRIEF DESCRIPTION OF THE DRAWINGS

VI. DETAILED DESCRIPTION

Figure 1:
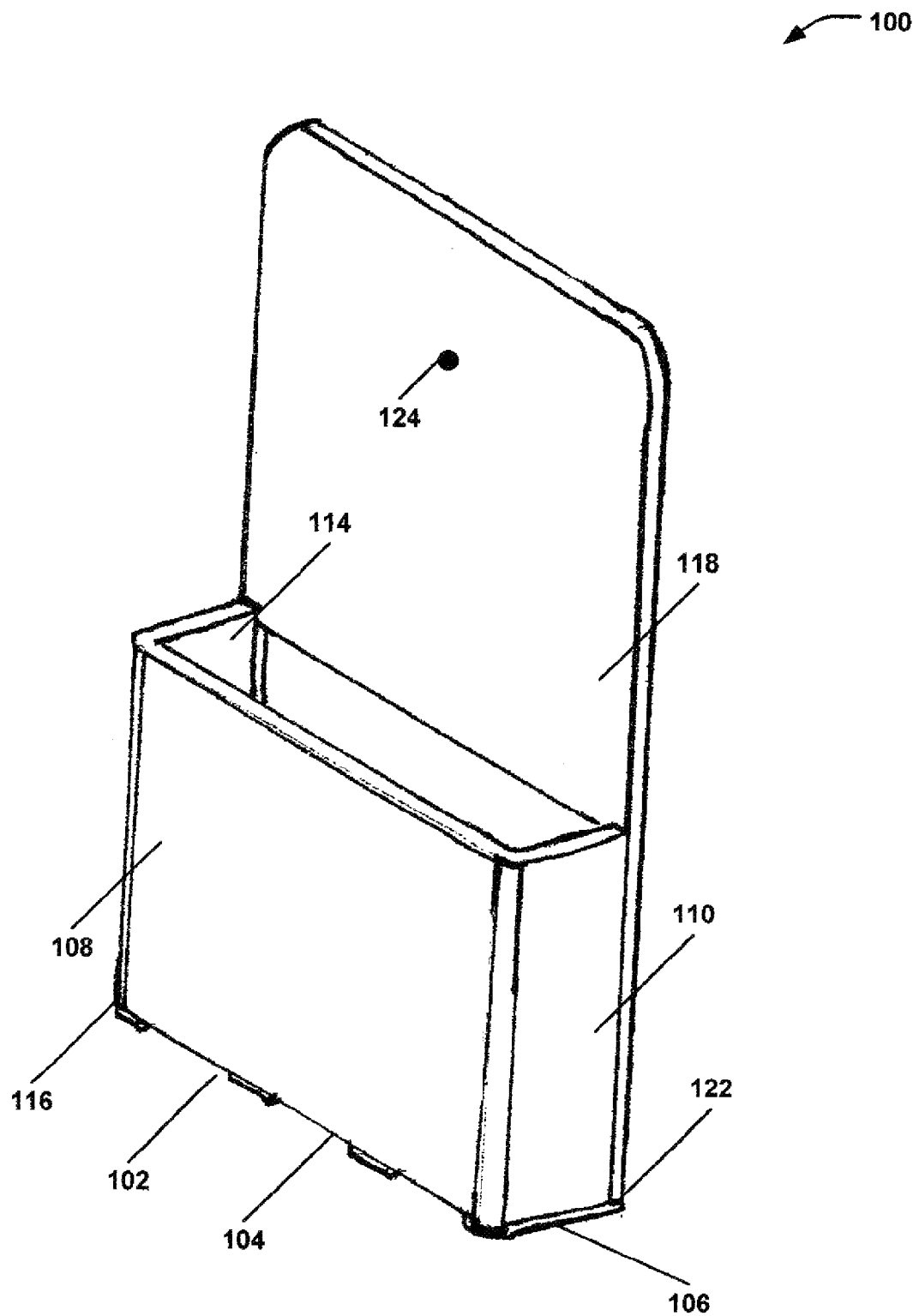
FIG. 1 shows a front perspective view of an embodiment of an electronic device holder.

FIG. 1 shows a front perspective view of an embodiment of an electronic device holder 100, or apparatus. The holder 100 includes a bottom support surface 102 configured to at least partially support a weight of an electronic device (not shown). The bottom support surface 102 includes a first edge 104 and a second edge 106. A first substantially vertical surface 108 is positioned proximate the first edge 104 of the bottom surface 102 and a second substantially vertical surface 110 is positioned proximate the second edge 106 of the bottom surface 102. A fastener (not shown) may be attached to at least one of the bottom support surface 102, the first vertical surface 108, and the second vertical surface 110.

An illustrative fastener may include a screw, a nail, a hook and loop, an adhesive, a hook, a string, a wire, a magnet, a clasp, a hanger, or virtually any type of fastener. The holder 100 may be constructed from plastic, wood, metal, elastic, cloth, mesh, ceramic, or virtually any type of material.

A third vertical surface 114 may be positioned proximate a third edge 116 of the bottom support surface 102. A fourth vertical surface 118 may be positioned proximate a fourth edge 122 of the bottom support surface 102.

According a particular embodiment, a bottom support surface and another surface may be adjustable with respect to one another. For example, a surface may include a sliding mechanism or elastic that permits adjustment of the dimensions of the space for holding the electronic device. The electronic device may include at least one of a cellular telephone, a tablet, and a baby monitor, among virtually any type of electronic device.

Another embodiment may include a charging port and/or a power source for charging the electronic device. At least one of the first vertical surface and the bottom support surface may be constructed from an anti-microbial material. The first vertical surface may be constructed from a transparent or semitransparent material.

Another surface may be positioned above the bottom support surface. Such a surface could function to keep out rain, sunlight, or other weather forces. The apparatus may be attached to a surface as an aftermarket item. The bottom support surface may be at an angle relative to a floor surface. The apparatus may include a key hook or other mechanism to hold additional objects or apparel.

The bottom support surface 102 and/or a vertical surface may include apertures. Some of the apertures (not shown) may prevent liquids from accumulating (e.g., when the holder 100 is cleaned). Other apertures 124 may be used for screw or hook fasteners. The holder may be attached to virtually any surface, including that of a seat or interior vehicle surface. Other embodiments may be attached to a bicycle, a wall surface, or exercise equipment, among others.

The holder of another embodiment may include a cup holder, a motion sensor, and/or alarm circuitry to remind a user of the electronic device. For example, the holder may sense the presence of an electronic device (e.g., a weight sensor or switch), and may beep or flash to remind a user of the electronic device. The alarm may be timed or triggered by motion around the holder.

Figure 2:
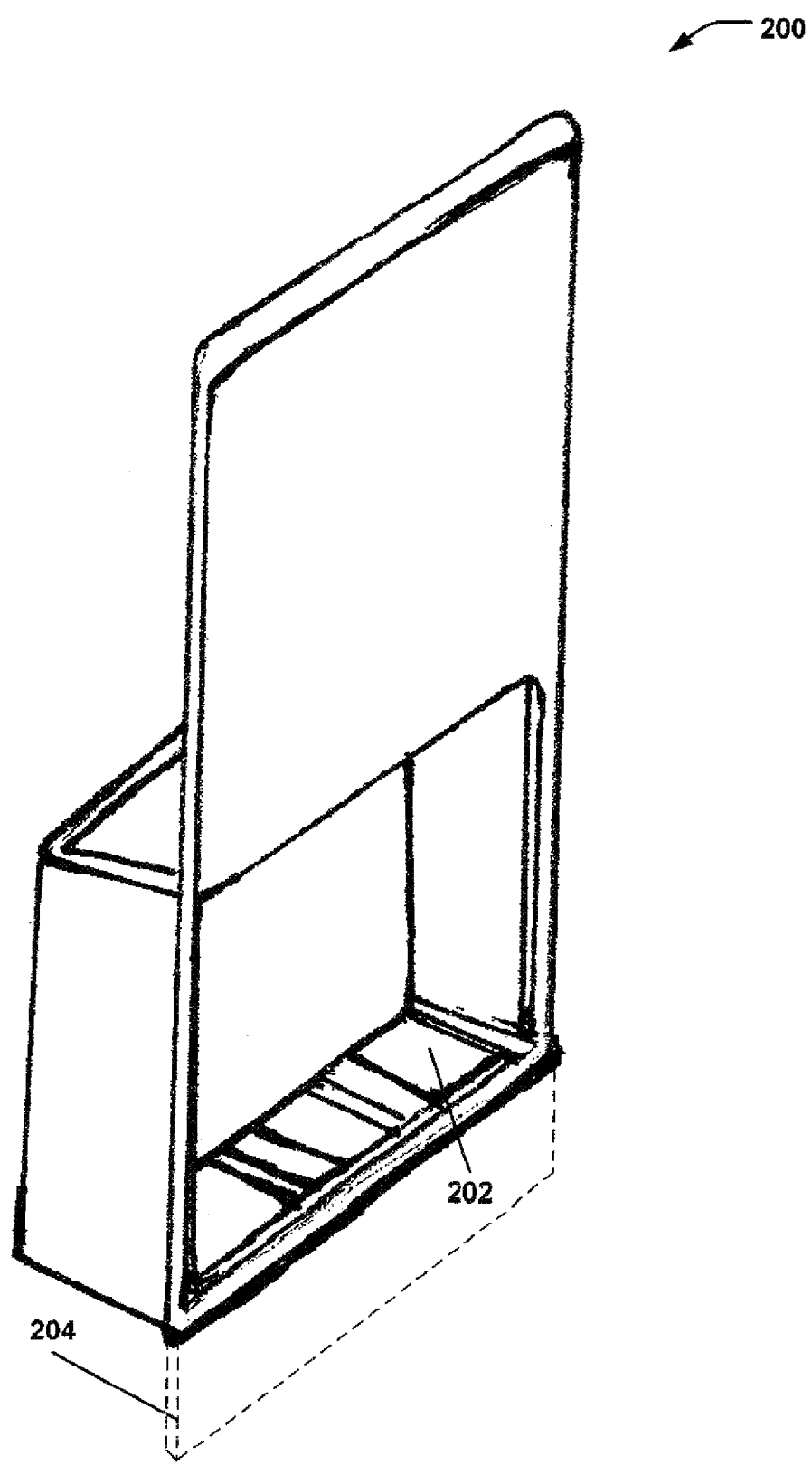
FIG. 2 shows a rear perspective view of an embodiment of an electronic device holder.

FIG. 2 shows a rear view of an electronic device holder 200. The holder may be similar to the holder 100 of FIG. 1. Aperture 202 is included to allow drainage and ventilation. Dashed line 204 depicts how another embodiment could include an elongated extension for fastening and support considerations.

Figure 3:
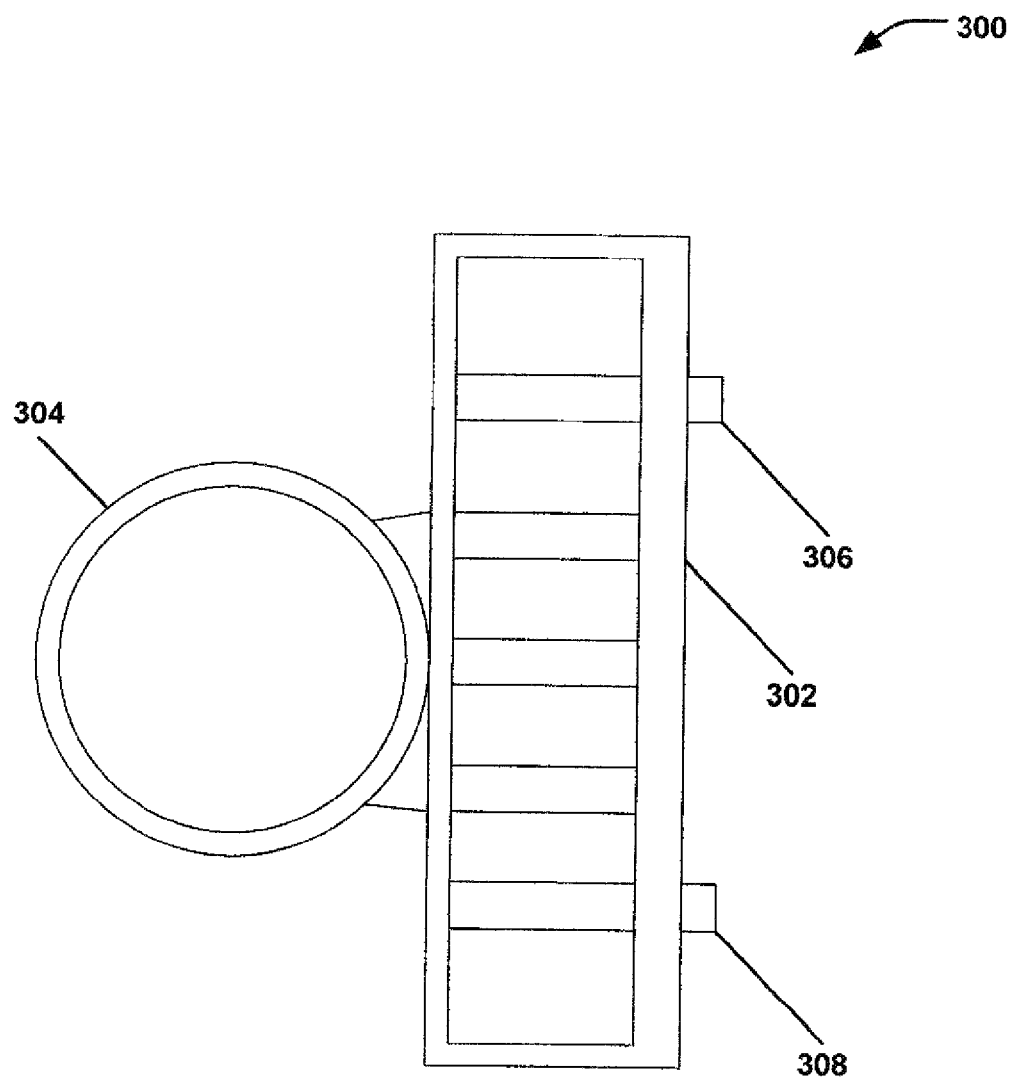
FIG. 3 shows a block diagram of a top view of an apparatus that includes an electronic device holder and a cup holder.

FIG. 3 shows a block diagram of a top view of an apparatus 300 that includes an electronic device holder 302 and a cup holder 304. The electronic device holder 302 may be similar to that shown in FIGS. 1 and 2. Fasteners 306, 308 may attach the apparatus 300 to a mounting surface.

Those skilled in the art may make numerous uses and modifications of and departures from the specific apparatus and techniques disclosed herein without departing from the inventive concepts. Consequently, the disclosed embodiments should be construed as embracing each and every novel feature and novel combination of features present in or possessed by the apparatus and techniques disclosed herein and limited only by the scope of the appended claims, and equivalents thereof.

The invention claimed is:

1. An apparatus comprising:
 a substantially horizontal bottom support surface configured to at least partially support a weight of an electronic device, wherein the bottom support surface includes a first edge and a second edge;
 a first substantially vertical surface positioned proximate the first edge of the bottom surface;
 a second substantially vertical surface positioned proximate the second edge of the bottom surface;
 another surface positioned above the bottom support surface, wherein the another surface can keep out weather and environmental forces;
 apertures in at least one of the bottom support surface and the vertical surface to prevent liquids from accumulating when the apparatus is cleaned; and
 fasteners attached to the bottom support surface, the first vertical surface, and the second vertical surface.

2. The apparatus of claim 1, further comprising a third vertical surface positioned proximate a third edge of the bottom support surface.

3. The apparatus of claim 2, further comprising a fourth vertical surface positioned proximate a fourth edge of the bottom support surface.

4. The apparatus of claim 1, wherein one of the bottom support surface and the first vertical surface is adjustable with respect to another the bottom support surface and, the first vertical support surface.

5. The apparatus of claim 1, wherein one of the first vertical surface and the second vertical surface is adjustable with respect to another of the first vertical surface and the second vertical surface.

6. The apparatus of claim 1, wherein the electronic device includes at least one of a cellular telephone, a tablet, and a baby monitor.

7. The apparatus of claim 1, further comprising a charging port.

8. The apparatus of claim 1, further comprising a power source for charging the electronic device.

9. The apparatus of claim 1, wherein at least one of the first vertical surface and the bottom support surface is constructed from an anti-microbial material.

10. The apparatus of claim 1, wherein the first vertical surface is constructed from a transparent or semitransparent material.

11. The apparatus of claim 1, wherein at least one of the first vertical surface and the bottom support surface is constructed from an elastic material.

12. The apparatus of claim 1, further comprising a third surface positioned above the bottom support surface.

13. The apparatus of claim 1, wherein the apparatus is attached to a surface as an aftermarket item.

14. The apparatus of claim 1, wherein the bottom support surface is at an angle relative to a floor surface.

15. The apparatus of claim 1, further comprising a key hook.

16. The apparatus of claim 1, wherein the bottom support surface includes an aperture.

17. The apparatus of claim 1, wherein the first vertical surface includes an aperture.

18. The apparatus of claim 1, further comprising a cup holder.

19. The apparatus of claim 1, further comprising a motion sensor.

20. The apparatus of claim 1, further comprising an alarm to remind a user of the electronic device.

* * * * *